Oct. 28, 1969  A. J. MAZZIO ET AL  3,475,093
FEED MECHANISM FOR PHOTOCOPY MACHINE OR THE LIKE
Filed Jan. 25, 1967  9 Sheets-Sheet 6

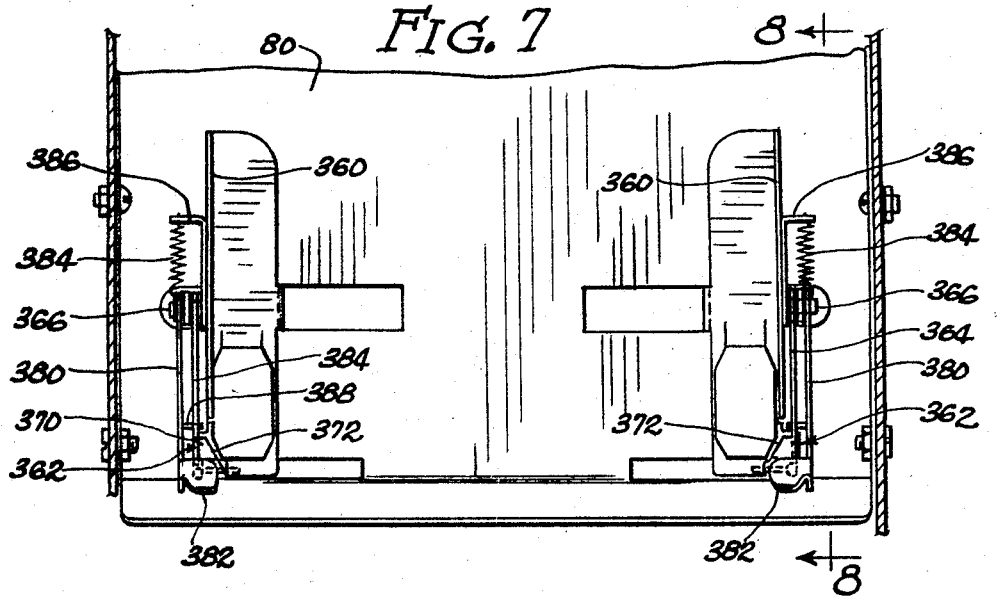
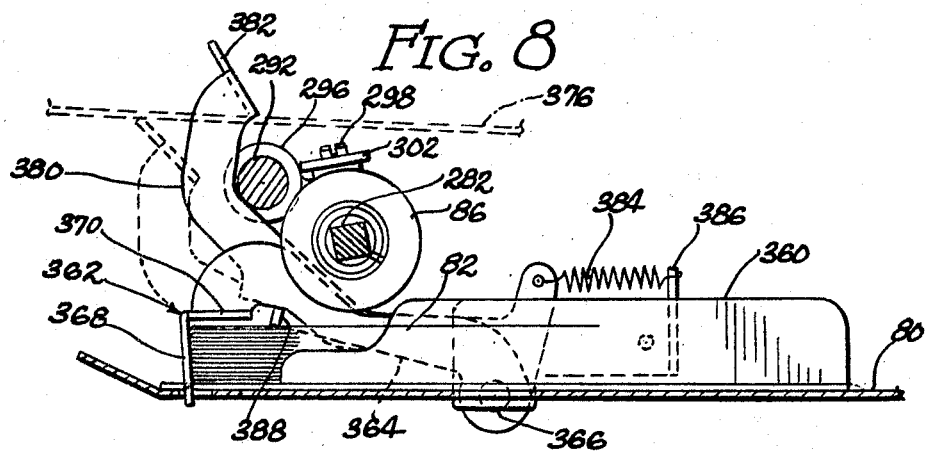
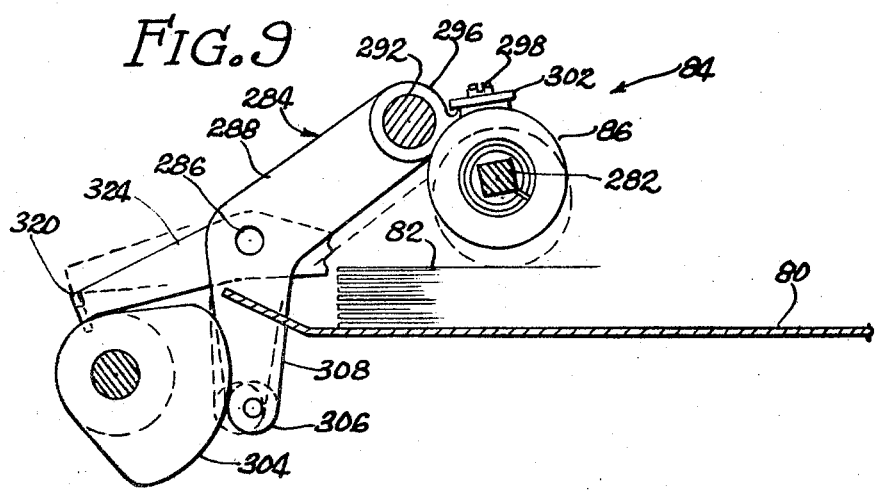

Oct. 28, 1969  A. J. MAZZIO ET AL  3,475,093
FEED MECHANISM FOR PHOTOCOPY MACHINE OR THE LIKE
Filed Jan. 25, 1967  9 Sheets-Sheet 8

United States Patent Office 3,475,093
Patented Oct. 28, 1969

3,475,093
FEED MECHANISM FOR PHOTOCOPY MACHINE OR THE LIKE
Anthony James Mazzio, Chicago, and Louis G. Birr, Jr., Skokie, Ill., assignors to A. B. Dick Company, Niles, Ill., a corporation of Illinois
Filed Jan. 25, 1967, Ser. No. 611,688
Int. Cl. G03g 15/00
U.S. Cl. 355—3
16 Claims

ABSTRACT OF THE DISCLOSURE

A photocopy machine having a feed mechanism whereby a copy sheet is fed to the exposure device in response to the insertion of the original sheet. The copy sheets are fed from a feed table having one or more corner separators which are automatically raised when the access cover is opened for loading of copy sheets.

---

Certain features of the photocopy machine disclosed as an illustrative embodiment in this application are disclosed and claimed in the copending Mazzio application Ser. No. 569,402, filed Aug. 1, 1966, now Patent No. 3,343,834, issued Sept. 26, 1967. Other features are disclosed and claimed in the copending application of Anthony James Mazzio and Lawrence A. Borneman on Developer Mechanism for Photocopy Machine or the Like, Ser. No. 623,667, filed Mar. 16, 1967.

This invention relates to photocopy machines or the like, and pertains particularly to feed mechanisms for such machines.

Photocopy machines have been provided in the prior art whereby an original sheet, inserted into the machine, is transported to an exposure device, along with a copy sheet, which is fed from a stack of such sheets within the machine. The exposure device produces an image of the original sheet on the copy sheet. Provision is made for developing and fixing the image on the copy sheet, so as to produce a finished photocopy.

The general objective of the present invention is to provide a feed mechanism which functions automatically in response to the insertion of the original sheet, so as to feed and transport both the copy sheet and the original sheet to the exposure device, in response to the movement of the original sheet into the machine, without any further assistance from the operator.

Another general objective is to facilitate and expedite the loading of a new stack of copy sheets into the machine.

In accordance with the present invention, the first-mentioned objective is achieved by providing a feed mechanism having a control element adapted to actuate a power feeding device in response to the insertion of the original sheet into the machine, the power feeding device being effective to feed a copy sheet from the stack of such sheets in the machine, and to forward the copy sheet to the exposure device. The feeding movement of the copy sheet preferably operates a second control element, adapted to actuate a second power feeding device, whereby the original sheet is advanced to the exposure device.

The second-mentioned objective is achieved by providing a feed table having at least one corner separator, and preferably a pair of corner separators, which are automatically raised when the access cover is opened, so that a new stack of copy sheets may readily be loaded onto the feed table and under the corner separators. The corner separators are automatically caused to move downwardly against the corners of the stack when the access cover is closed.

Further objects, features and advantages of the present invention will appear from the following description of an illustrative embodiment, taken with the accompanying drawings, in which:

FIG. 7 is a fragmentary generally horizontal section, taken generally along the line 7—7 in FIG. 1 and showing particularly the mechanism for automatically raising the corner separators.

FIG. 8 is a fragmentary vertical section, taken generally along the line 8—8 in FIG. 7.

FIG. 9 is another fragmentary vertical section, taken along the line 9—9 in FIG. 5.

Figure 1:
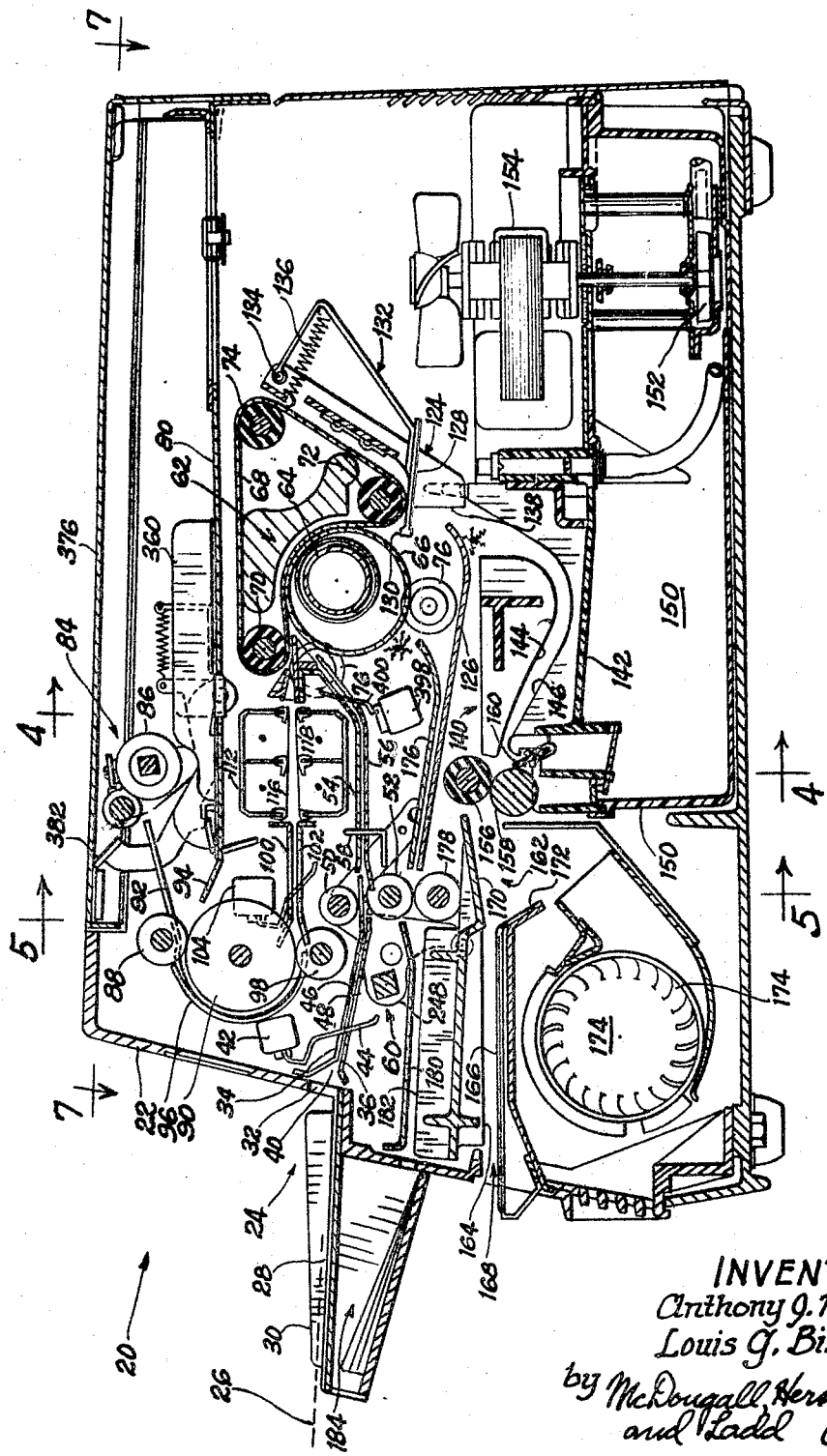
FIG. 1 is a longitudinal section taken vertically through a photocopy machine to be described as an illustrative embodiment of the present invention, the view being taken generally along the line 1—1 in FIG. 2.
Figure 2:
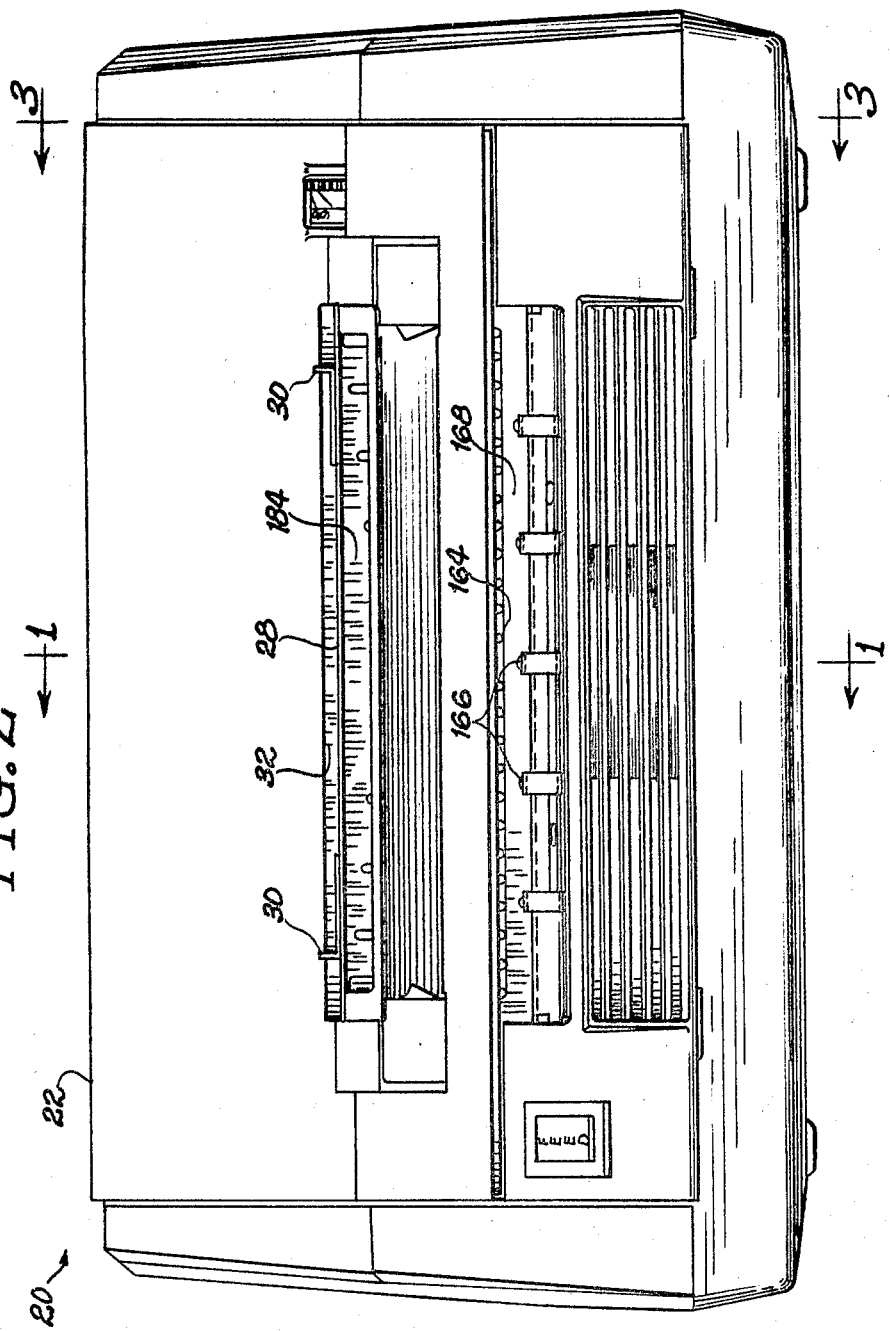
FIG. 2 is a front elevational view of the photocopy machine.

As already indicated, the drawings illustrate a photocopy machine 20, shown generally in FIGS. 1–5. The various working parts of the machine 20 are enclosed within a housing 22 which may be opened at several points for inspection and servicing of the machine.

Guide means 24 are provided on the photocopy machine 20 to receive the original sheet 26 which is to be copied. Externally of the housing 22, such guide means 24 comprises a table or platform 28, with side rails or flanges 30 thereon, adapted to guide the original sheet 26 through an entrance slot 32 in the housing 22. Within the housing 22, upper and lower guide plates or members 34 and 36 are provided, with a slot or opening 40 therebetween, to receive the original sheet.

In accordance with the present invention, the insertion of the original sheet 26 is adapted to operate a control element in the form of an electrical switch 42, having an operating arm 44 engageable by the original sheet as it is moved between the guide plates 34 and 36. As will be described in greater detail shortly, the operation of the switch 42 causes the feeding of a copy sheet within the machine.

The guide plates 34 and 36 are effective to direct the original sheet between upper and lower feed rollers 50 and 52 which are initially out of engagement and spaced apart, as shown in FIG. 1. From the feed rollers 50 and 52, the original sheet passes between another pair of upper and lower guide plates 54 and 56.

The initial movement or insertion of the original sheet is arrested by a movable stop 58 which projects through slots 57 and 59 (FIG. 6) in the guide plates 54 and 56. The stop 58 has the effect of accurately locating the original sheet 26.

The feed rollers 50 and 52, and also the movable stop 58, constitute components of a power feeding device 60 for advancing the original sheet 26 to an exposure device 62, adapted to produce an image of the original sheet on the corresponding copy sheet. The guide plates 54 and 56 are adapted to direct the original sheet 26 to the exposure device 62. In a manner to be described in detail presently, the operation of the power feeding device 60 is controlled by the movement of the copy sheet to the exposure device 62.

The exposure device 62 may assume various forms, but is illustrated as comprising a tubular lamp 64 (FIG. 1). Means are provided for superimposing the original sheet 26 and the copy sheet. The superimposed sheets are then transported past the lamp 64 so that a latent image is produced on the copy sheet, corresponding to any writing, printed matter, drawings or the like which may appear on the original sheet. It will be understood that the original sheet 26 may be in the form of any document or the like which is to be copied.

In the illustrated exposure device 62, the superimposed original and copy sheets are fed between a hollow transparent or translucent roller 66 and one or more endless belts 68, which press the superimposed sheets against the roller 66. A tubular lamp 64 is mounted within the transparent roller 66. The belt 68 is strung around three rollers or pulleys 70, 72 and 74, at least one of which is driven so as to advance the belt and rotate the roller 66. After passing around the roller 70, the belt 68 passes part way around the transparent roller 66, and then moves away from the roller 66 to pass around the rollers 72 and 74. The ends of the transparent roller 66 are supported by a plurality of bearing rollers 76.

The illustrated machine 20 comprises a feed table 80 for holding a stack of copy sheets 82 (FIGS. 8 and 9). A power feeding mechanism 84 is provided for feeding the copy sheets, one at a time, from the feed table 80 and transporting each copy sheet to the exposure device 62. In general, the power feeding mechanism 84 comprises a pair of feed rollers 86, adapted to feed the topmost copy sheet 82 from the stack on the feed table 80. A single feed roller could be employed, but it is preferred to employ a pair of rollers. Initially, the feed rollers 86 are spaced above the stack of sheets 82. In a manner to be described in detail presently, the power feeding mechanism 84 is adapted to move the feed rollers 86 downwardly against the stack, in response to the actuation of the control switch 42 by the insertion of the original sheet 26. The feed rollers 86 are then effective to feed the topmost sheet off the front of the feed table 68. The rollers 86 are preferably rotated continuously by the power feed mechanism 84.

From the rollers 86, the copy sheet 82 is fed between forwarding rollers 88 and (FIG. 1), which also are preferably rotated continuously. Upper and lower guide plates 92 and 94 are provided to direct the copy sheet 82 into the nip between the rollers 88 and 90.

The power feeding mechanism 84 is effective to lift the feed rollers 86 from the stack of sheets on the feed table 62, after the topmost sheet has been fed between the rollers 88 and 90. Thus, only a single copy sheet is fed from the feed table.

In order to reverse the direction of the copy sheet, a generally semicircular guide plate 96 is provided around approximately one-half the circumference of the roller 90. The guide plate 96 causes the copy sheet 82 to travel around the roller 90 and between the roller 90 and another forwarding roller 98.

Figure 6:
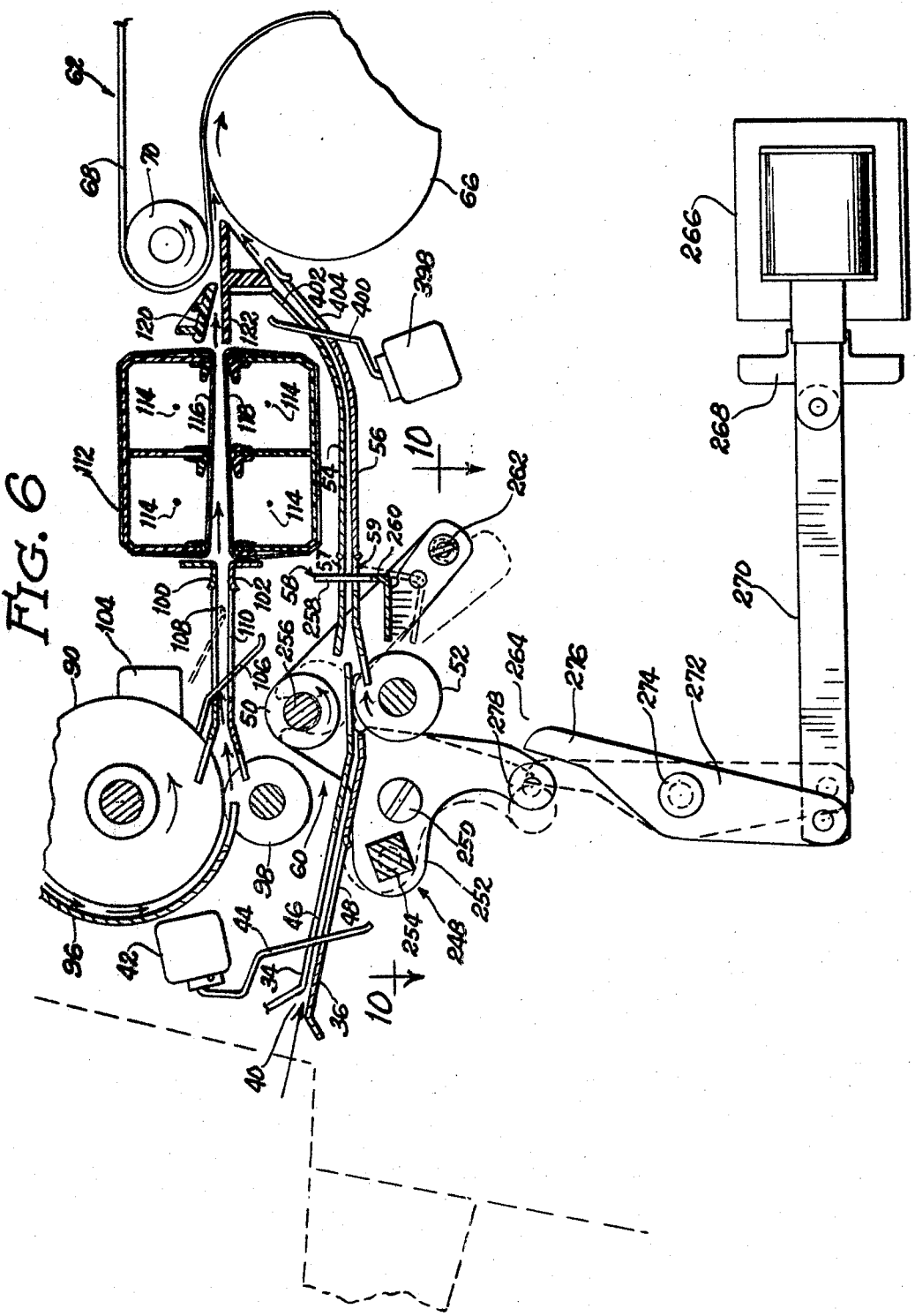
FIG. 6 is a fragmentary, diagrammatic longitudial section, taken generally along the line 6—6 in FIG. 5.

From the rollers 90 and 98, the copy sheet 82 is directed between guide plates 100 and 102. In the course of its movement, the copy sheet 82 operates another control element in the form of a second electrical switch 104 having an operating arm 106 which extends through slots 108 and 110 in the guide plates 100 and 102 (FIG. 6). In a manner to be described in greater detail presently, the operation of the switch 104 actuates the power feeding device 60 for the original sheet 26 so as to advance the original sheet to the exposure device 62. The power feeding device 60 is effective to move the roller 50 downwardly so as to press the original sheet against the roller 52, which is preferably driven continuously. At the same time, the stop 58 is moved downwardly, out of the way of the original sheet 26.

The illustrated machine 20 employs an electrostatic process which requires the electrification of each copy sheet before it is fed to the exposure device 62. To electrify the copy sheets, the machine is provided with a corona housing 112, through which the copy sheets are directed by the guide plates 100 and 102. Within the corona housing 112, a corona discharge is produced around a plurality of wires or other electrodes 114. The corona discharge causes the application of an electrostatic charge to each copy sheet 82. The corona discharge may be operated continuously, but it is preferred to employ the switch 104 to control the application of the high voltage to the wires 114 so as to initiate the corona discharge, before each copy sheet enters the corona housing 112.

The copy sheet 82 is guided through the corona housing 112 by upper and lower guide members 116 and 118 which preferably are made of insulating material. From the corona housing 112, the copy sheet is directed between guide members 120 and 122, and then between the transparent cylinder or roller 66 and the belt 68.

The original sheet 26 and the corresponding copy sheet 82 are fed simultaneously between the roller 66 and the belt 68 so that the two sheets will be superimposed. Preferably, the sheets are timed so that the leading edge of the copy sheet 82 projects slightly beyond the original sheet. The slight projection or overlapping of the copy sheet facilitates the separation of the copy sheet from the original sheet, after the superimposed sheets have passed between the roller 66 and the belt 68. As disclosed and claimed in the copending Mazzio application, Ser. No. 569,402, filed Aug. 1, 1966, now Patent 3,343,834, issued Sept. 26, 1967, the sheets are preferably separated by a sheet separating device 124 (FIG. 1), which causes the original sheet 26 and the copy sheet 82 to travel along separate paths. The original sheet 26 is directed above a guide plate 126, while the copy sheet is directed below the guide plate.

The illustrated sheet separating device 124 comprises a movable finger or blade 128 which intercepts the projecting edge of the copy sheet 82 and causes the copy sheet to be curled away from the original sheet 26. Preferably, the tip portion of the finger 128 has a special formation for temporarily retaining the projecting edge of the copy sheet 82. As illustrated, the tip portion of the finger 128 is formed with a protuberance or bump 130.

The illustrated finger 128 extends transversely across the tangential path of the sheets 26 and 82. The finger 128 is mounted on an arm 132 which is swingable about a pivot 134. A spring 136 is connected to the arm 132 so as to bias the finger 128 into its initial position.

The leading edge of the copy sheet 82 engages the movable finger 128 and causes it to swing about the pivot 134. The leading edge of the copy sheet is caught by the protuberance 130, so that the copy sheet moves with the finger 128. The pivot 134 is located so that the finger 128 swings downwardly and laterally to the right as seen in FIG. 1. As a result, the copy sheet 82 is curled away from the original sheet 26. In this way, the movable finger 128 carries the copy sheet around the deflector plate 126, while the original sheet 26 is intercepted by the deflector plate.

As the finger 128 is swung laterally, the copy sheet 82 has an increased tendency to escape from the protuberance 130. The escape of the copy sheet 82 is assisted by a pair of strippers 138, between which the finger 128 is movable.

After escaping from the protuberance 130 on the finger 128, the copy sheet 82 passes downwardly along the strippers 138 and into a developer system 140 (FIG. 1), which is disclosed and claimed in the copending Mazzio and Borneman application, Ser. No. 623,667, previously mentioned above. In general, the developer system 140 comprises a developer tray or trough 142, adapted to hold a liquid developer, through which the copy sheet is moved. Upper and lower guides 144 and 146 are provided to direct the copy sheet through the liquid developer in the tray 142.

The liquid developer produces a visible image on the copy sheet, corresponding to the latent image of the original sheet. The photocopy machine employs an electrostatic copying system, in which an electrostatic latent image is produced by the exposure device 62. The electrostatic image corresponds to the dark areas of the original sheet. The liquid developer contains a finely divided toner which adheres to the electrostatic image and renders it visible.

The main supply of the liquid developer is contained in a tank 150 which is disposed beneath the tray 142. The liquid developer is circulated from the tank 150 into the tray 142 by a pump 152 which is driven by a motor 154.

From the developer tray 142, the copy sheet is directed between a pair of squeegee rollers 156 and 158 (FIG. 1) which remove most of the liquid developer from the copy sheet. The lower roller 158 is engaged by rubber squeegee blade 160 which scrapes most of the liquid developer off the lower roller. The liquid developer is returned to the tank 150.

After leaving the rollers 156 and 158, the copy sheet travels across an opening 162 and between upper and lower guide members 164 and 166, with a slot 168 therebetween. The slot 168 extends to the outside of the machine, so that the finished photocopy is delivered through the slot to the operator. Upper and lower converging guides 170 and 172 direct the copy sheet 82 between the members 164 and 166.

A fan 174 is preferably provided to produce a blast of air across and along the opening 162, so as to cause rapid drying of the copy sheet. The liquid employed in the liquid developer is generally highly volatile so that it evaporates rapidly from the copy sheet.

As previously mentioned, the original sheet 26 is intercepted by the deflector plate 126, so that the original sheet passes along the upper side of the deflector plate. Another guide plate 176 (FIG. 1) is provided above the plate 126, to direct the original sheet between the roller 52 and another forwarding or feed roller 178. Thus, the roller 52 helps to feed the original sheet 26 into the machine, and also helps to propel the original sheet out of the machine. From the rollers 52 and 178, the original sheet passes between upper and lower guide members 180 and 182 and out of the machine through a slot 184. In this way, the original sheet 26 is delivered back to the operator.

Figure 3:
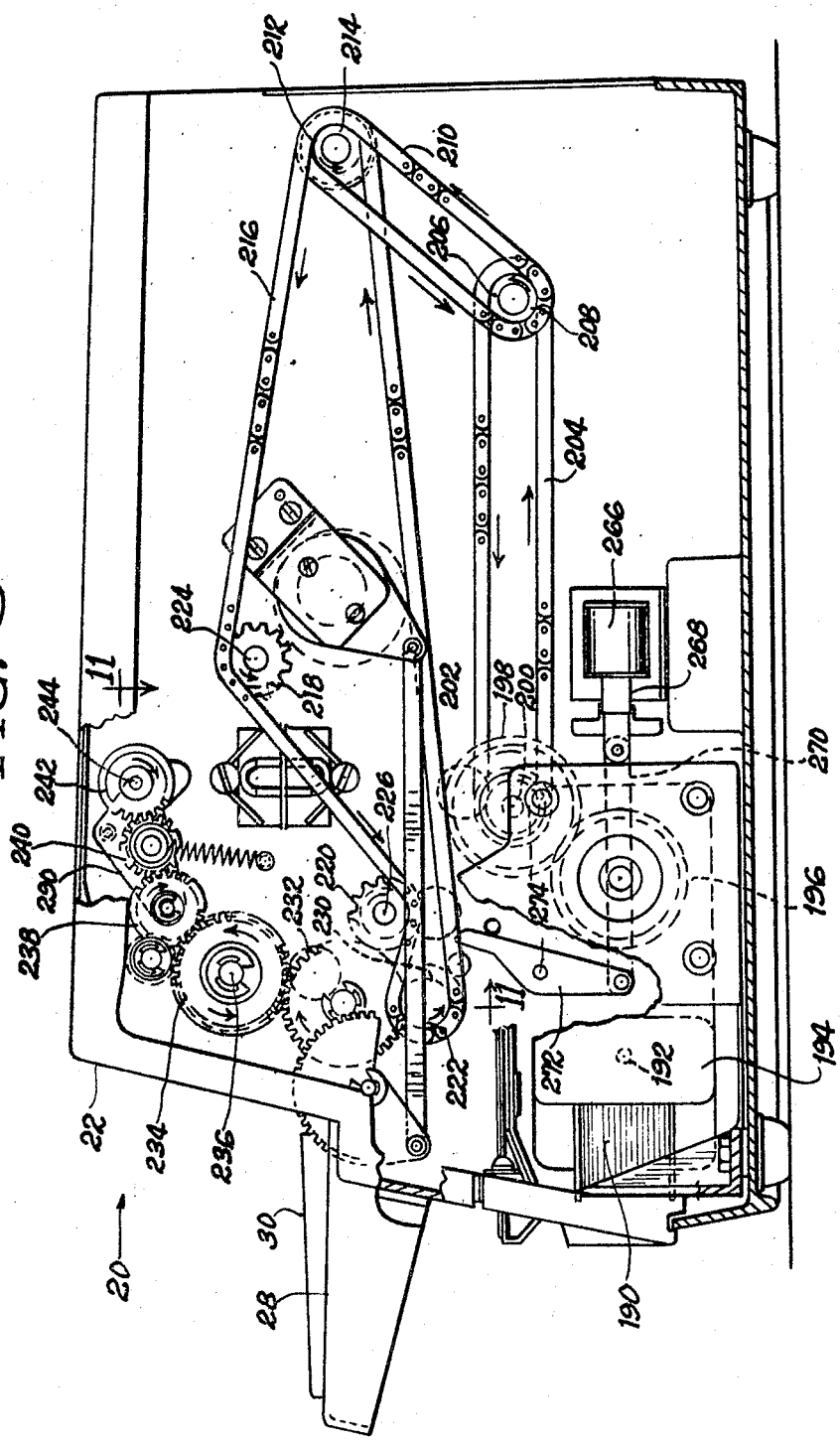
FIG. 3 is a side elevation with one side cover of the machine removed, the view being partly in section along the line 3—3 in FIG. 2.
Figure 5:
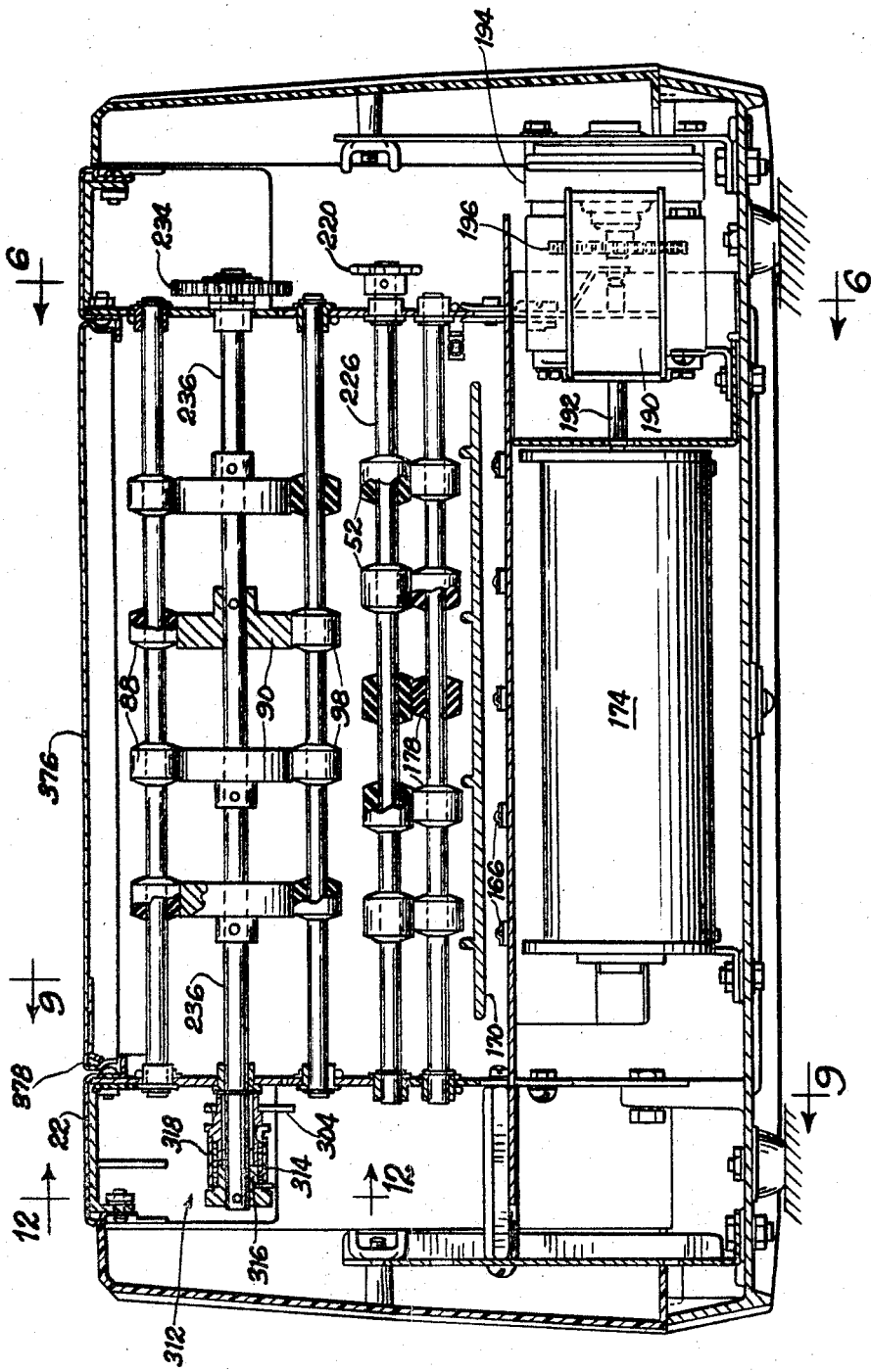
FIG. 5 is another somewhat diagrammatic vertical cross section, taken generally along the line 5—5 in FIG. 1.

The photocopy machine 20 is provided with a suitable drive train, as shown particularly in FIGS. 3 and 5. An electric motor 190 is provided to operate the fan 174, while also driving the various rollers. The motor 190 has a rotor shaft 192 on which the fan 174 is mounted. The shaft 192 also drives a reduction gear box 194 having a low speed output gear 196.

A gear 198 meshes with the gear 196 and is mounted on a shaft 200 which also carries the lower squeegee roller 158. The shaft 200 also carries a sprocket 202 around which a chain 204 is trained.

The chain 204 is also trained around a sprocket 206 which is secured to another sprocket 208. A second chain 210 is strung around the sprocket 208 and also around a sprocket 212.

Another sprocket 214 is secured to the sprocket 212 and is employed to drive a third chain 216. It will be seen that the chain 216 is strung around three additional sprockets 218, 220 and 222.

The sprocket 218 is mounted on a shaft 224 which also carries the drive roller 70 for the belt 68. The rollers 66, 72 and 74 are frictionally driven by the belt. The sprocket 220 is mounted on a shaft 226 which carries the feed roller 52 for the original sheet. The rollers 50 and 178 are frictionally driven by the roller 52.

The sprocket 222 is connected to a gear 230 which drives a gear 232. Another gear 234 is driven by the gear 232. The gear 234 is mounted on a shaft 236 which also carries the forwarding roller 90. The rollers 88 and 98 are frictionally driven by the roller 90.

The gear 234 meshes with a gear 238 which in turn drives a gear 240 meshing with still another gear 242. The gear 242 is mounted on a shaft 244 which also carries the feed rollers 86.

Figure 10:
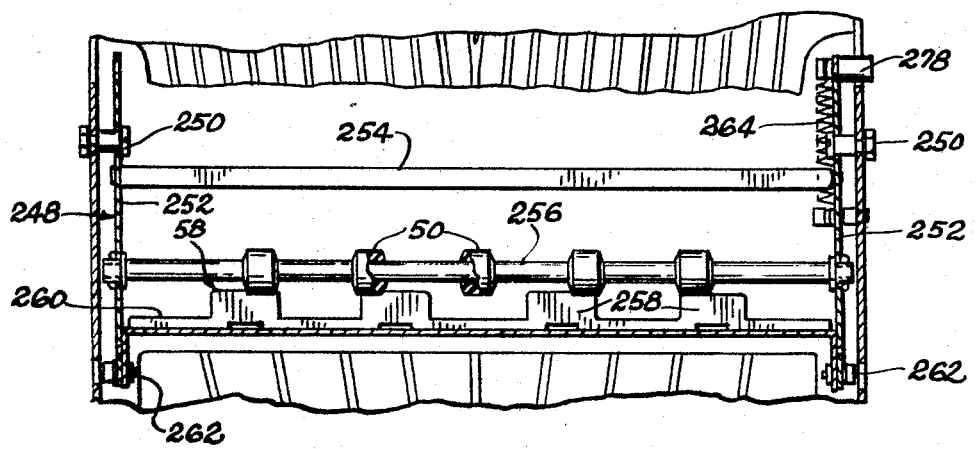
FIG. 10 is a diagrammatic, spread-out section, taken generally as indicated by the line 10—10 in FIG. 6.

FIGS. 6 and 10 illustrate additional details of the power feeding device 60 for the original sheet 26. As already indicated, the roller 52 is continuously driven. The upper roller 50 is movably mounted on a carriage or frame 248, swingable about pivots 250. The illustrated carriage 248 comprises a pair of side plates or levers 252. A crossbar 254 is connected rigidly between the levers 252. The roller 50 is mounted on a shaft 256 which is rotatably mounted on the levers 252.

The movable stop 58 is also mounted on the carriage 248. It will be seen from FIG. 10 that the stop 58 comprises a plurality of stop fingers 258 which are formed on a bar 260 extending between the levers 252. The bar 260 is adjustably mounted on the levers 252 by means of clamping screws 262. In this way, the exact position of the stop 58 may be adjusted.

Initially, the carriage 248 is biased by a spring 264 (FIG. 10) to the position shown in full lines in FIG. 6. In this position, the roller 50 is spaced above the roller 52. Power means are provided for swinging the carriage 248 in a clockwise direction, against the biasing action of the spring 264, so as to move the roller 50 against the roller 52. As shown in FIG. 6, such power means preferably take the form of a solenoid 266 having an armature 268 which is connected by means of a link 270 to the lower end of a lever 272. A pivot 274 supports the intermediate portion of the lever 272. The upper end of the lever 272 is formed into an arm 276 which is engageable with a pin 278 on one of the levers 252.

The solenoid 266 is connected in circuit with the control switch 104. Thus, when the copy sheet 82 operates the switch 104, the solenoid 266 is energized. As a result, the carriage 248 is swung clockwise so that the roller 50 presses the original sheet 26 against the continuously rotating roller 52. At the same time, the stop fingers 258 are moved out of the path of the original sheet, so that the original sheet can be propelled to the exposure device 62.

Figure 11:
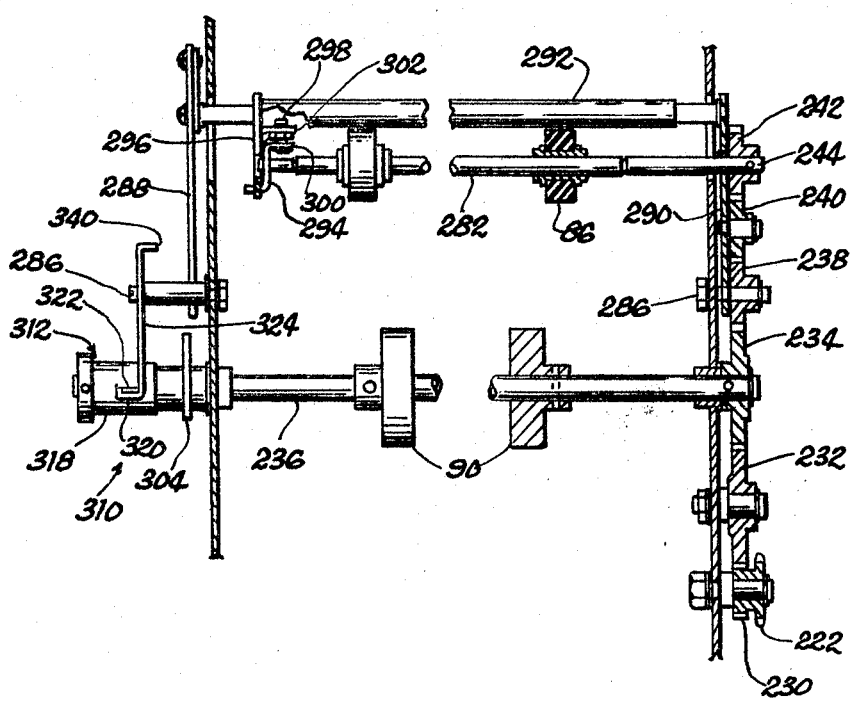
FIG. 11 is another diagrammatic, spread-out section, taken generally as indicated by the line 11—11 in FIG. 3.

FIGS. 9 and 11 illustrate additional details of the power feeding mechanism 84 for feeding the individual copy sheets 82 from the feed table 80 to the exposure device 62. It will be seen from FIG. 9 that the feed rollers 86 are mounted on a square portion 282 of the shaft 244, which is rotatably mounted on a carriage or frame 284. The rollers 86 are slidable along the square shaft portion 282 so that the lateral positions of the rollers may readily be adjusted. The carriage 284 is swingable about pivots 286, which are co-axial with the gear 238. The gear 240 is mounted on the carriage 284, while the gear 242 is secured to the shaft 244 for the feed rollers 86.

The illustrated carriage 284 comprises side plates or levers 288 and 290. A crossbar 292 is rigidly connected between the levers 288 and 290. To provide for adjustment of the rollers 86, the outboard end of the roller shaft 244 is rotatably mounted on a bracket or bearing 294 which is adjustably mounted on an arm 296 secured to the crossbar 282. An adjusting screw 298 is provided between the flange 300 on the bracket 294 and a similar flange 302 on the arm 296. This adjustment makes it possible to adjust the feed rollers 86 so that both of them will engage the stack of copy sheets 82 with substantially equal pressure.

Initially, the carriage 284 is positioned as shown in full lines in FIG. 9, with the feed rollers 86 raised above the copy sheets 82. Power means in the form of a cam 304 is provided for operating the carriage 284 so as to swing the feed rollers 86 downwardly against the copy sheets 82. The continuously rotating feed rollers 86 are then effective to feed the topmost copy sheet from the stack. The cam 304 is engaged by a follower roller 306 on an arm 308 which is formed integrally with the lever 288.

Figure 12:
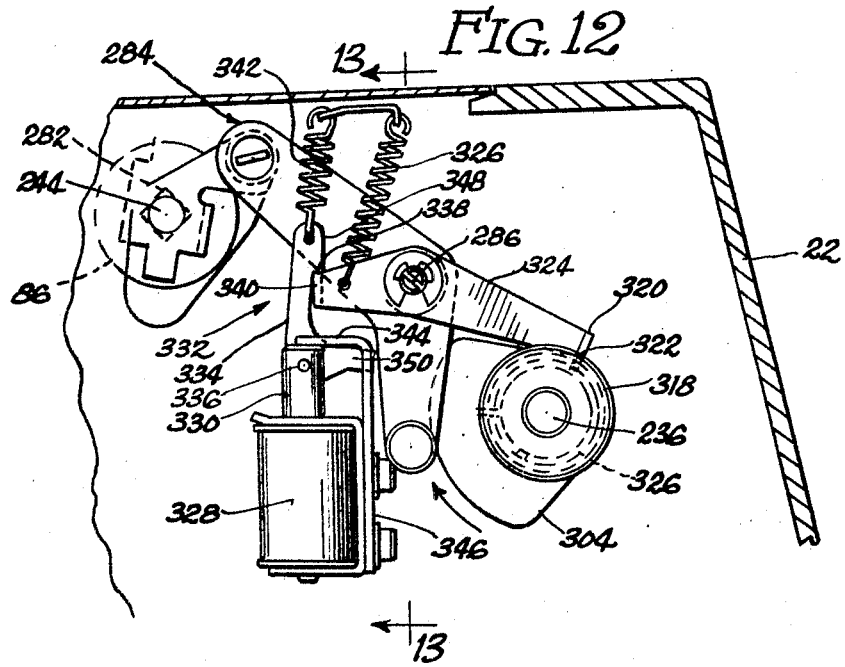
FIG. 12 is a fragmentary vertical section, taken generally along line 12—12 in FIG. 5.
Figure 13:
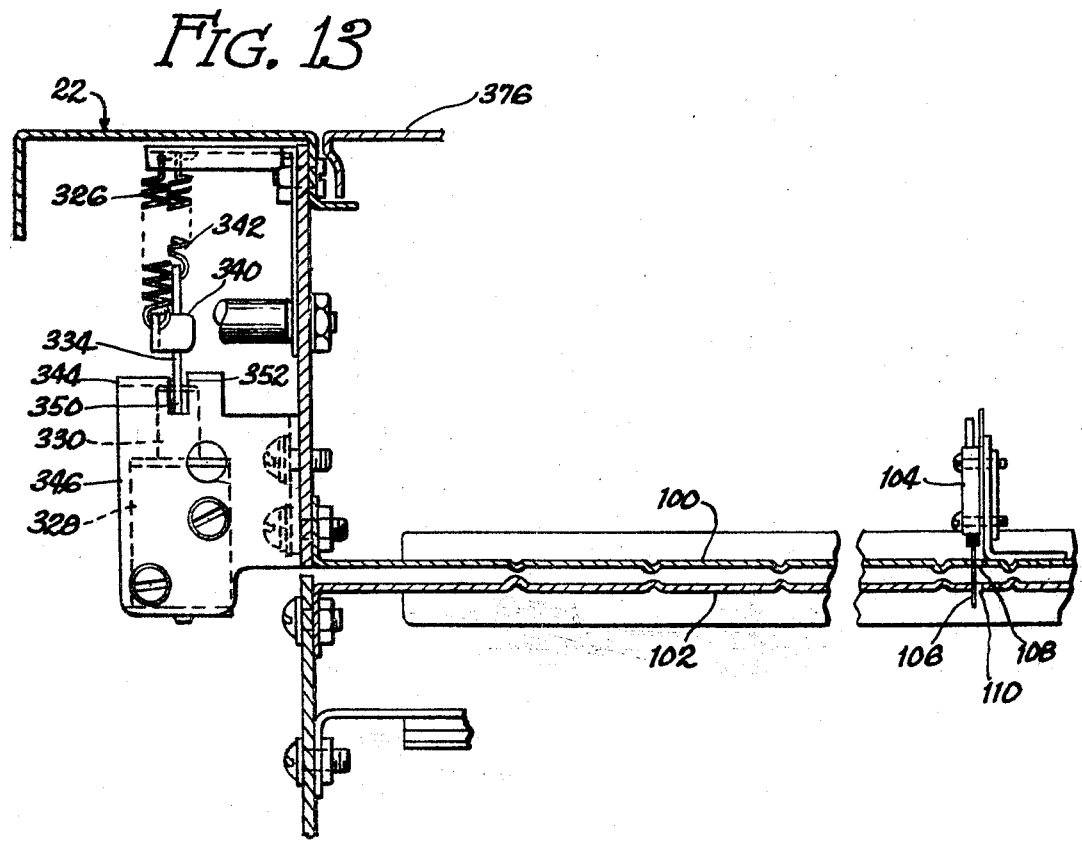
FIG. 13 is a fragmentary diagrammatic section, taken generally along the line 13—13 in FIG. 12.

Initially, the cam 304 is stationary, as shown in FIG. 9. FIGS. 11–13 illustrate various details of a mechanism 310 for causing the cam 304 to rotate through a single revolution. In this way, the feed rollers 86 are lowered momentarily against the copy sheets, and then are raised again, so that only one copy sheet will be fed.

The mechanism 310 takes the form of a single cycle clutch mechanism, whereby the cam 304 is adapted to be coupled to the shaft 236 by a clutch 312. It will be recalled that the shaft 236 also supports the forwarding roller 90. The clutch 312 is of the known type in which a helical spring 314 (FIG. 5) forms a frictional driving connection between a hub 316 and a sleeve 318, unless the sleeve 318 is held in a stationary position, in which case the clutch slips. It will be seen that the hub 316 is connected to the shaft 236, while the sleeve 318 is connected to the cam 304.

A movable pawl or dog 320 is provided to hold back the sleeve 318, which is formed with a notch or opening 322 for receiving the pawl. The illustrated pawl 320 is formed on a lever 324 which is swingable about one of the pivots 286 for the carriage 284. A spring 326 is connected to the lever 324 to bias the pawl 320 against the sleeve 318 and into the notch 322.

Electrically operable means are provided for releasing the pawl 320 from the notch 322 so that the cam 304 will be rotated through a single revolution. Such means preferably comprise a solenoid 328, as shown to best advantage in FIGS. 12 and 13. The solenoid 328 has a movable armature 330. To provide for momentary releasing movement of the lever 324, an escapement 332 is preferably provided between the solenoid armature 330 and the lever 324. Such escapement 332 comprises a lever or link 334 which is mounted on the armature 330 by means of a pivot 336. The lever 334 is formed with a pawl or tooth 338 which is initially engaged with an ear or flange 340 on the lever 324. A return spring 342 is connected to the lever 334 to bias the lever and the armature 330 in an upward direction. The upward movement of the armature 330 is limited by a stop flange 344 which is formed on a mounting bracket 346. It will be seen that the mounting bracket 346 supports the solenoid 328.

The lever 334 has an upper arm 348 on which the tooth 338 is formed and also a laterally projecting arm 350 which extends through a slot 352 in the mounting bracket 346.

When the solenoid 328 is energized, the armature 330 and the lever 334 are pulled downwardly against the biasing action of the spring 342. The tooth 338 pulls the ear 340 downwardly and thus swings the lever 324 counterclockwise so that the pawl 320 is disengaged from the notch 322. The lateral arm 350 thereupon engages the bottom of the slot 352 and is swung counter-clockwise, with the result that the tooth 338 escapes from the ear 340. Thus, the lever 324 is released so that the pawl 320 returns into engagement with the sleeve 318. As soon as the cam 304 completes one revolution, the pawl 320 enters the notch 322 and stops the sleeve 318 and the cam 304.

The solenoid 328 is connected in circuit with the switch 42, so that the solenoid is energized when the switch 42 is operated by the insertion of the original sheet 26. Thus, insertion of the original sheet initiates the operation of the power feeding mechanism 84 for the copy sheets 82.

Additional details of the feed table 80 are shown in FIGS. 7 and 8. Left- and right-hand side rails 360 are adjustably mounted on the feed table 80 for lateral sliding movement. The side rails 360 are adapted to position the sides of the stack of copy sheets 82.

The side rails 360 are provided with corner separators 362 for restraining the front corners of the stack in such a manner as to insure that only the topmost sheet will be fed from the stack by the feed rollers 86. Each corner separator 362 is formed on the front end of a lever 364 which is swingable about a pivot 366, mounted on the corresponding side rail 360. A single corner separator could be employed on only one of the side rails, but it is much more advantageous to provide corner separators on both side rails.

Each corner separator 364 comprises a generally vertical stop member or bar 368, adapted to be positioned in front of the corresponding front corner of the stack, so as to hold back the stack when subjected to the action of the feed rollers 86. A generally horizontal lip or flange 370 projects rearwardly from each stop member 368 and is adapted to rest upon the topmost copy sheet, across the corresponding front corner thereof. It will be seen that each lip 370 is generally triangular and is formed with a diagonal edge 372, adapted to extend diagonally across the corner of the topmost sheet.

The levers 364 support the corner separators 362 for generally vertical movement. During normal operation, the lips 370 are pressed against the top of the stack by the weight of the corner separators 362 and the levers 364. As the stack is depleted, the corner separators 362 move downwardly by gravity. When the topmost sheet is advanced by the rollers 86, the corner separators 362 cause buckling of the front corners of the topmost sheet, with the result that the topmost sheet is able to move past the corner separators. However, all of the underlying sheets in the stack are retained, so that only the topmost sheet is fed.

When a new stack of copy sheets is to be placed on the feed table 80, it is necessary to raise the corner separators 362 so that the front corners of the stack can be inserted under the lips 370 of the corner separators. The illustrated machine is constructed and arranged so that the corner separators 362 are automatically raised during the loading operation.

The raising action is controlled by an access cover 376 which is movably mounted on the housing 22 of the machine 20. It is necessary to open the cover 376 in order to load copy sheets onto the feed table 80. The cover 376, when closed, excludes light from the inside of the housing 22 so as to prevent unwanted exposure of the copy sheets to light. The illustrated cover 376 is swingable upwardly about hinges or pivots 378 (FIG. 5) on one side of the cover.

The corner separators 362 are adapted to be raised by operating levers 380 having upwardly projecting portions 382 which are engageable by the cover 376 as it is swung downwardly to its closed position. The illustrated levers 380 are swingable about the same pivots 366 which support the corner separator levers 364.

The operating levers 380 are biased toward their raised positions by suitable means, preferably taking the form of springs 384 connected between the levers 380 and anchoring brackets 386 on the side rails 360. Connecting means are provided to raise the corner separators 362 when the levers 380 are raised. The illustrated levers 380 are formed with flanges or ears 388 which are engageable with the lower edges of the corner separator levers 364. When the levers 380 are raised, the ears 388 engage and lift the corner separator levers 364, so that the lips 370 are raised above the normal level of the top of the stack. The biasing springs 384 are effective to raise both the operating levers 380 and the corner separator levers 364. A new stack of copy sheets may be loaded onto the feed table 80 and inserted under the lips 370 of the corner separators 362. When the cover 376 is closed, it presses downwardly upon the upper portions 382 of the levers 380 and causes downward movement of the levers 380. As a result, the ears 388 are moved downwardly away from the corner separator levers 364 so that the levers 380 are effectively disconnected from the corner separator levers. The corner separators 362 move downwardly by gravity until the lips 370 rest upon the top of the stack of copy sheets. The weight of the cover 376 is sufficient to overcome the biasing action of the springs 384, so that the operating levers 380 are held in their downwardly displaced positions by the cover.

Figure 4:
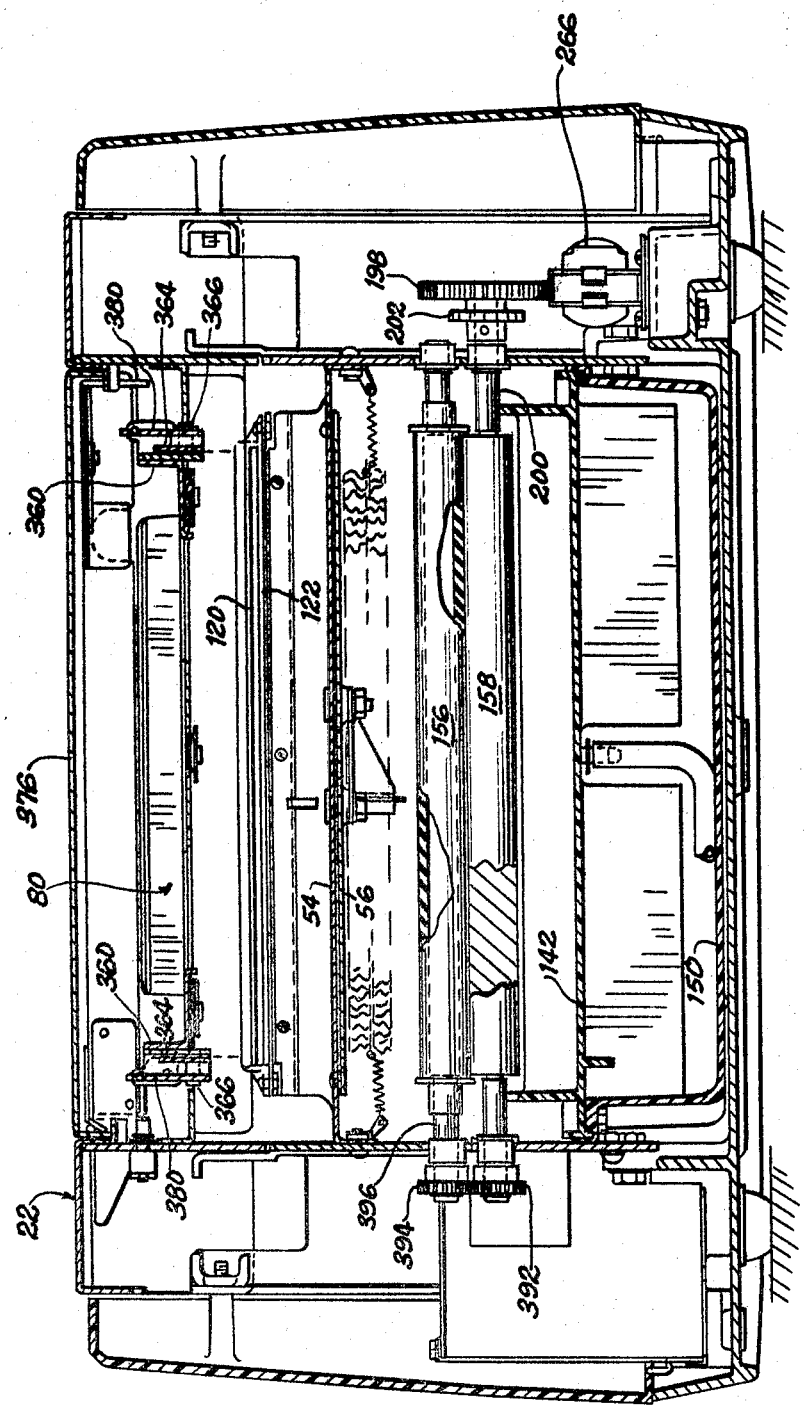
FIG. 4 is a somewhat diagrammatic vertical cross section, taken generally along the line 4—4 in FIG. 1.

As already indicated, the drive gear 198 is mounted on the shaft 200 for the lower squeegee roller 158. As shown in FIG. 4, the upper squeegee roller 156 is driven by gears 392 and 394. The gear 392 is mounted on the lower roller shaft 200. The gear 394 meshes with the gear 392 and is mounted on the shaft 396 for the upper squeegee roller 156.

As shown in FIGS. 1 and 6, the original sheet is adapted to operate another control switch 398 as the original sheet is advanced between the guide plates 54 and 56, toward the exposure device 62. The switch 398 has an operating arm 400 which projects through slots 402 and 404 in the guide plates 54 and 56. The switch 398 is preferably employed to maintain the energization of the corona discharge in the corona housing 112 until the trailing end of the original sheet has passed the operating arm 400 of the switch. It will be recalled that the switch 104 controls the initial application of the high voltage to the corona electrodes 114 in the corona housing 112. The high voltage is maintained on the electrodes 114 as long as either the switch 104 or the switch 398 is operated. The switches 104 and 398 may simply be connected in parallel in the energizing circuit for the corona electrodes 114.

It will be helpful to summarize the operation of the photocopy machine 20, although the operation has already been fully described. The original sheet 26 to be copied is inserted into the machine through the slot 32 and between the guide plates 34 and 36.

Referring to FIG. 1, the original sheet is pushed into the machine until the sheet is arrested by the stop 58. The movement of the original sheet 26 between the guide plates 34 and 36 displaces the switch arm 44 and thereby operates the switch 42.

Referring to FIG. 12, the operation of the switch 42 energizes the solenoid 328, which pulls the armature 330 and the lever 334 downwardly. The tooth 338 on the lever 334 engages the ear 340 and causes the lever 324 to swing counter-clockwise so that the pawl 320 is withdrawn from the notch 322 in the clutch operating sleeve 318. As a result, the clutch 312 causes the sleeve 318 and the cam 304 to rotate. The lever 324 is operated only momentarily, because the lateral arm 350 engages the bottom of the slot 352 and causes the lever 334 to swing counter-clockwise so that the tooth 338 escapes from the ear 340. When the sleeve 318 completes one revolution, the pawl 320 again enters the notch 322 and stops the rotation of the sleeve 318 and the cam 304.

Referring to FIG. 9, the roller 306 follows the cam 304, with the result that the carriage 284 swings clockwise, so as to lower the feed rollers 86 against the stack of copy sheets 82. The topmost sheet is fed off the stack by the continuously rotating feed rollers 86. As the cam 304 completes its revolution, the carriage 284 is again swung counter-clockwise so as to raise the feed rollers 86 from the stack. Thus, only one copy sheet 82 is fed from the stack.

Referring to FIG. 1, the copy sheet 82 is fed between the forwarding rollers 88 and 90 which take over the propulsion of the sheet. The guide plate 96 carries the copy sheet around the roller 90 and directs it between the rollers 90 and 98. These rollers then propel the copy sheet between the guide plates 100 and 102, whereupon the copy sheet displaces the arm 106 and operates the switch 104. The sheet passes through the corona housing 112 and thus is given an electrostatic charge by the corona discharge therein. The electrified sheet passes between the guide members 120 and 122 to the exposure device 62.

The operation of the switch 104 causes the application of the high voltage to the corona electrodes 114. In addition, the operation of the switch 104 energizes the solenoid 266 of the power feeding device 60 for the original sheet. Referring to FIG. 6, the solenoid 266 causes the lever 272 to swing counter-clockwise, so that it engages the pin 278 on the carriage 248. As a result, the carriage 248 is swung clockwise against the biasing action of the spring 264. The stop fingers 258 on the stop member 58 are moved out of the path of the original sheet 26. Moreover, the roller 50 is moved downwardly so as to press the original sheet against the continuously rotating feed roller 52. Accordingly, the original sheet is advanced between the guide plates 54 and 56 to the exposure device 62. Such movements of the sheet displaces the arm 400 and thereby operates the switch 398, which is effective to maintain the energization of the corona electrodes 114.

Referring again to FIG. 1, the original sheet 26 and the electrified copy sheet 82 are superimposed and fed between the transparent roller 66 and the belt 68 of the exposure device. The continuously moving belt 68 propels the sheets past the tubular lamp 64, disposed within the roller 66. The resulting exposure of the copy sheet produces a latent electrostatic image on the copy sheets, corresponding to the original sheet.

From the transparent roller 66, the superimposed sheets are directed tangentially against the sheet separating finger 128. The original sheet 26 and the copy sheet 82 are timed so that the copy sheet is slightly in advance of the original sheet. Thus, the leading edge of the copy sheet 82 strikes the finger 128 first and is caught by the protuberance 130 on the finger. The movement of the copy sheet causes the finger 128 to swing about the pivot 134, with the result that the copy sheet is curled laterally away from the original sheet. Thus, the copy sheet 82 is directed below the deflector plate 126, while the original sheet is intercepted by the deflector plate 126 and is directed along the top of the plate.

When the copy sheet 82 engages the strippers 138, it escapes from the protuberance 130 and passes downwardly into the developer tray 142. The action of the liquid developer in the tray 142 renders the latent image visible.

From the developer tray 142, the guides 146 and 148 direct the copy sheet between the squeeze rollers 156 and 158 which remove most of the liquid developer and propel the copy sheet across the opening 162 and between the guide members 164 and 166. The fan 174 produces a blast of air in the opening 162, so as to dry the copy sheet. The guide members 164 and 168 direct the copy sheet out of the machine through the slot 168, from which the sheet is removed by the operator.

The original sheet travels between the guide plates 126 and 176 and is fed between the rollers 52 and 178, which propel the sheet between the guide members 180 and 182. The original sheet emerges from the machine through the slot 184, from which it is removed by the operator.

Referring to FIGS. 4 and 9, the cover 376 is raised when it is desired to load a new stack of the copy sheets 82 onto the feed table 80. The raising of the cover 376 releases the operating levers 380, so that they are raised by the springs 384. The ears 388 on the levers 380 engages the corner separator levers 364 and raise the corner separators 362. Thus, the stack may readily be slipped under the lips 370 of the corner separators 362.

When the cover 376 is closed, it pushes the operating levers 380 downwardly against the biasing action of the springs 384. As a result, the ears 388 are moved out of engagement with the corner separator levers 364. The corner separators 362 move downwardly so that the lips 370 rest upon the front corners of the topmost copy sheet in the stack. During normal operation, the corner separators 362 hold back the stack and cause buckling of the topmost sheet as it is fed off the stack. The topmost sheet buckles at its front corners but resumes its original shape after being fed past the corner separators 362. The action of the corner separators 362 insures that only the topmost sheet will be fed.

It will be recognized that the normal operation of the photocopy machine is fully automatic. The insertion of the original sheet into the machine initiates the operation of the power feeding device for the copy sheets, so that the topmost copy sheet is fed from the stack to the exposure device. The movement of the copy sheet initiates the operation of the power feeding device for the original sheet so that the original sheet is also advanced to the exposure device.

When additional copy sheets are to be loaded onto the feed table, the opening of the access cover automatically raises the corner separators, so that the new stack of sheets may readily be slipped under the horizontal lips of the corner separators. When the cover is closed, the corner separators are automatically lowered against the topmost sheet.

Various other modifications, alternative constructions, and equivalents may be employed without departing from the true spirit and scope of the invention, as exemplified in the foregoing description and defined in the following claims.

We claim:
1. A feed mechanism for a photocopy machine, comprising the combination of an exposure device for producing an image on a copy sheet corresponding to an original sheet,
a feed table for holding a stack of copy sheets,
guide means for receiving the original sheet,
a control element operable by movement of an original sheet onto said guide means,
first power feeding means operable by said control element for feeding a copy sheet from a stack to said exposure device,
and additional power feeding means for advancing the original sheet from said guide means to said exposure device in timed relation to the movement of the copy sheet,
said control element comprising an electrical switch operable by the original sheet,
said first power feeding means comprising a feeding device for feeding one copy sheet at a time from said feed table,
a single cycle clutch for operating said feeding device,
said clutch having a normally engaged holding pawl,
a solenoid operable by said switch,
an escapement connected between said solenoid and said holding pawl for momentarily releasing said pawl in response to energization of said solenoid,
and means for forwarding each copy sheet from said feeding device to said exposure device.
2. A feed mechanism for a photocopy machine, comprising the combination of an exposure device for producing an image on a copy sheet corresponding to an original sheet,
a feed table for holding a stack of copy sheets,
guide means for receiving the original sheet,
a control element operable by movement of an original sheet onto said guide means,
first power feeding means operable by said control element for feeding a copy sheet from a stack to said exposure device,
and additional power feeding means for advancing the original sheet from said guide means to said exposure device in timed relation to the movement of the copy sheet,
said control element comprising an electrical switch operable by the original sheet,
said first power feeding means comprising at least one feed roller engageable with the stack on said feed table for feeding the top sheet therefrom,
a cam for causing movement of said feed roller into engagement with the stack,
a single cycle clutch for rotating said cam,
said clutch having a normally engaged holding pawl for de-activating said clutch,
a solenoid operable by said switch,
an escapement connected between said solenoid and said holding pawl for momentarily releasing said pawl in response to energization of said solenoid,
and forwarding means for forwarding the sheet fed from said feed table to said exposure device.
3. A feed mechanism for a photocopy machine, comprising the combination of an exposure device for producing an image on a copy sheet corresponding to an original sheet,
a feed table for holding a stack of copy sheets,
guide means for receiving the original sheet,
a control element operable by movement of an original sheet onto said guide means,
first power feeding means operable by said control element for feeding a copy sheet from a stack to said exposure device,
and additional power feeding means for advancing the original sheet from said guide means to said exposure device in timed relation to the movement of the copy sheet,
said additional power feeding means comprising a second control element operable by the copy sheet in the course of its movement from said table to said exposure device,
and a power feeding device operable by said second control element for advancing the original sheet from said guide means to said exposure device.
4. A feed mechanism according to claim 3, in which said second control element comprises an electrical switch operable by the copy sheet.
5. A feed mechanism according to claim 3, in which said second control element comprises an electrical switch operable by the copy sheet,
said power feeding device having an electrical actuator operable by said electrical switch.
6. A feed mechanism according to claim 3, in which said second control element comprises an electrical switch operable by the copy sheet,
said power feeding device comprising a solenoid operable by said switch,
and feed rollers movable by said solenoid against the original sheet for advancing the original sheet to said exposure device.
7. A feed mechanism for a photocopy machine, comprising the combination of an exposure device for producing an image on a copy sheet corresponding to an original sheet,
a feed table for holding a stack of copy sheets,
guide means for receiving the original sheet,
a control element operable by movement of an original sheet onto said guide means,
first power feeding means operable by said control element for feeding a copy sheet from a stack to said exposure device,
and additional power feeding means for advancing the original sheet from said guide means to said exposure device in timed relation to the movement of the copy sheet,
said control element comprising a switch operable by the original sheet,
said first feeding means comprising an electrically operable actuator response to the operation of said switch for causing the feeding of a copy sheet from the feed table,
said additonal power feeding means comprising a second control element in the form of a second electrical switch operable by the copy sheet in the course of its movement from said table to said exposure device, and a power feeding device having an electrical actuator operable by said second switch for advancing the original sheet from said guide means to said exposure device.

8. A feed mechanism for a photocopy machine, comprising the combination of an exposure device for producing an image on a copy sheet corresponding to an original sheet,
a feed table for holding a stack of copy sheets,
guide means for receiving the original sheet,
a control element operable by movement of an original sheet onto said guide means,
first power feeding means operable by said control element for feeding a copy sheet from a stack to said exposure device,
and additional power feeding means for advancing the original sheet from said guide means to said exposure device in timed relation to the movement of the copy sheet,
said control element comprising an electrical switch operable by the original sheet,
said first power feeding means comprising a first feeding device for feeding one copy sheet at a time from said table,
a single cycle clutch for operating said feeding device,
said clutch having a normally engaged holding pawl,
a solenoid operable by said switch,
an escapement connected between said solenoid and said holding pawl for momentarily releasing said pawl in response to energization of said solenoid,
and means for forwarding each copy sheet from said feeding device to said exposure device,
said additional power feeding means comprising a second control element in the form of a second electrical switch operable by the copy sheet in the course of its movement from said feed table to said exposure device,
and a second power feeding device operable by said second switch for advancing the original sheet from said guide means to said exposure device,
said second power feeding device comprising a second solenoid operable by said second switch,
and feed rollers movable by said second solenoid against the original sheet for advancing the original sheet to said exposure device.

9. A feed mechanism,
comprising a feed table for holding a stack of copy sheets,
a power feeding device for feeding one copy sheet at a time from said feed table,
a single cycle clutch for operating said feeding device,
said clutch having a normally engaged holding pawl,
a solenoid,
and an escapement connected between said solenoid and said holding pawl for momentarily releasing said pawl in response to energization of said solenoid.

10. A feed mechanism according to claim 9,
in which said feeding device comprises at least one feed roller engageable with the stack on said feed table for forwarding the top sheet therefrom,
and a cam operable by said single cycle clutch for causing movement of said feed roller into engagement with the stack.

11. A feed mechanism,
comprising the combination of a housing,
a feed table in said housing for holding a stack of sheets,
at least one corner separator having a stop portion disposed in front of one front corner of the stack and a lip portion projecting rearwardly from said stop portion and engageable with the top of the stack adjacent said front corner,
means movably mounting said corner separator for movement of said lip portion toward and away from the top of the stack,
means for selectively feeding the top sheet from the stack past said corner separator,
said housing having an opening therein over said feed table for the insertion of sheets onto said feed table,
a cover movably mounted on said housing for closing said opening,
and operating means operable by said cover for causing the movement of said corner separator against the top of the stack in response to closing movement of said cover, while causing the movement of said corner separator away from the top of the stack in response to the opening of said cover.

12. A feed mechanism according to claim 11,
in which said corner separator is one of a pair of such corner separators engageable with the opposite front corners of the stack of sheets on said feed table.

13. A feed mechanism according to claim 11,
in which said corner separator is constructed and arranged to provide gravitational biasing of said lip portion against the top of the stack,
said operating means including additional biasing means for raising said corner separator away from the top of the stack in response to the opening of said cover,
and means operable by closing movement of said cover for effectively disconnecting said additional biasing means from said corner separator.

14. A feed mechanism according to claim 11,
in which said corner separator is constructed and arranged for gravitational biasing of said lip portion against the top of the stack,
said operating means comprising a spring means for causing movement of said corner separator away from the top of the stack,
and means operable by closing movement of said cover for effectively disconnecting said spring means from said corner separator.

15. A feed mechanism according to claim 11,
in which said operating means comprises a movable member engageable with said corner separator for raising said separator away from the top of the stack,
and spring means for biasing said member in a direction to raise said corner separator,
said member having a portion engageable by said cover for moving said member out of engagement with said corner separator in response to said closing movement of said cover,
said corner separator being constructed and arranged for gravitational biasing of said lip portion against the top of the stack when said cover is closed.

16. A feed mechanism according to claim 11,
comprising a first lever supporting said corner separator for movement by gravity against the top of the stack,
said operating means comprising a second lever having an element engageable with said first lever for raising the corner separator away from the top of the stack,
and a spring biasing said second lever in a direction to raise said corner separator,
said second lever having a portion engageable by said cover for moving said second lever out of engagement with said first lever in response to said closing movement of said cover.

References Cited
UNITED STATES PATENTS 3,318,213    5/1967    Kowalski _____ 95—1.7

NORTON ANSHER, Primary Examiner
R. L. MOSES, Assistant Examiner

U.S. Cl. X.R.
271—8, 64; 355—27